(12) United States Patent
Lin et al.

(10) Patent No.: US 6,621,959 B2
(45) Date of Patent: Sep. 16, 2003

(54) PLANAR WAVEGUIDE DIFFRACTIVE BEAM SPLITTER/COUPLER

(75) Inventors: Eric-G. Lin, Hsinchu Hsien (TW); Ying-Tsung Lu, Hsinchu (TW); Chang-Sheng Chu, Hsinchu Hsien (TW)

(73) Assignee: Industrial Technology Research Institute (TW)

( * ) Notice: Subject to any disclaimer, the term of this patent is extended or adjusted under 35 U.S.C. 154(b) by 0 days.

(21) Appl. No.: 09/993,637

(22) Filed: Nov. 27, 2001

(65) Prior Publication Data

US 2003/0002792 A1 Jan. 2, 2003

(30) Foreign Application Priority Data

Jun. 29, 2001 (TW) .................................. 90115893 A

(51) Int. Cl.[7] .................................................. G02B 6/34
(52) U.S. Cl. ........................... 385/37; 385/24; 385/47; 359/130; 359/572
(58) Field of Search ...................... 385/37, 24, 47, 385/48; 359/574, 572

(56) References Cited

U.S. PATENT DOCUMENTS

| 4,274,706 A | 6/1981 | Tangonan | |
|---|---|---|---|
| 4,784,935 A | 11/1988 | Ehrfeld | 430/321 |
| 4,800,557 A | 1/1989 | Weber | 359/130 |
| 4,938,553 A | 7/1990 | Maerz | 385/14 |
| 4,953,935 A | 9/1990 | Suchoski, Jr. et al. | |
| 6,519,063 B1 * | 2/2003 | Lewis | 359/130 |

FOREIGN PATENT DOCUMENTS

| JP | 60-230608 | 11/1985 |
|---|---|---|
| JP | 02-137805 | 5/1990 |

OTHER PUBLICATIONS

K.Iizuka, "Engineering Optics", 1983, Springer–Verlang, pp. 150–151.

* cited by examiner

Primary Examiner—John Juba
Assistant Examiner—Leo Boutsikaris
(74) Attorney, Agent, or Firm—Birch, Stewart, Kolasch & Birch, LLP

(57) ABSTRACT

The invention provides a planar waveguide diffractive 1×N beam splitter/coupler. It utilizes an integrated circuit fabrication process to fabricate an integrated optic. A Fourier transform diffractive optical element (DOE) is formed on one end of a planar waveguide (planar lightwave circuit; PLC). Thus, an incident beam coming from one end of the planar waveguide can be diffracted into a plurality of output beams. On the other hand, a plurality of incident beams coming from one end of the planar waveguide can be coupled into one output beam. The beam splitter/coupler is easy to fabricate, small in size and more flexible for applications.

7 Claims, 9 Drawing Sheets

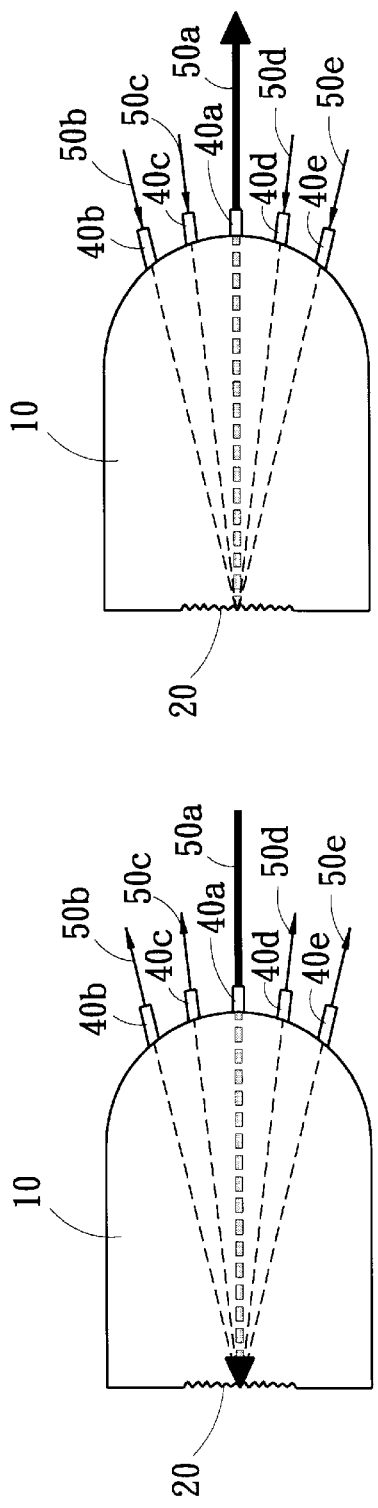
FIG. 6
FIG. 7
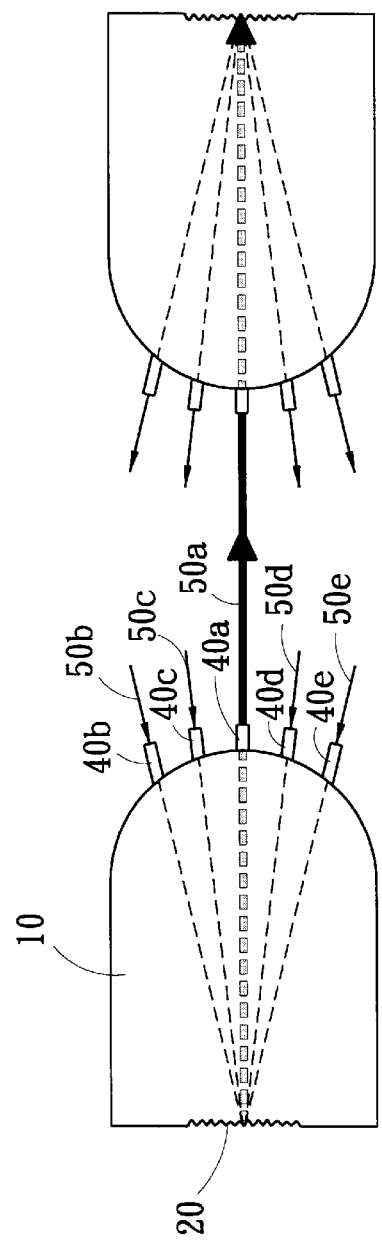
FIG. 8

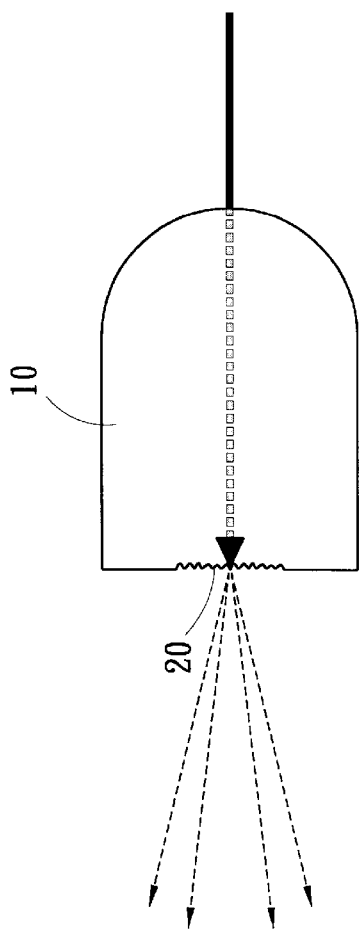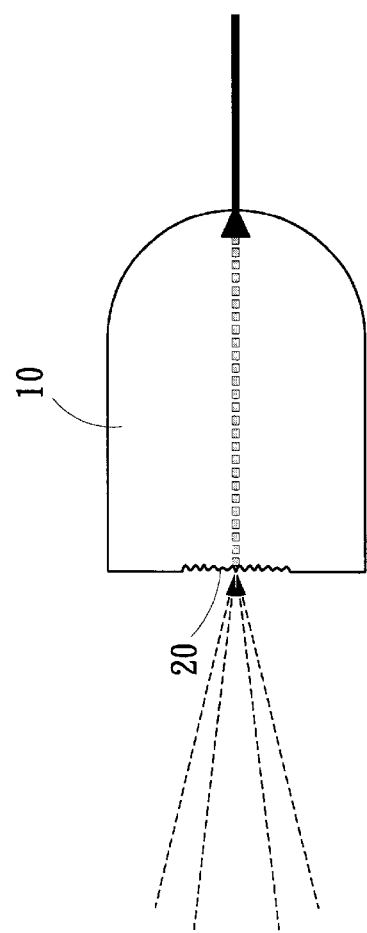
FIG. 9A
FIG. 9B

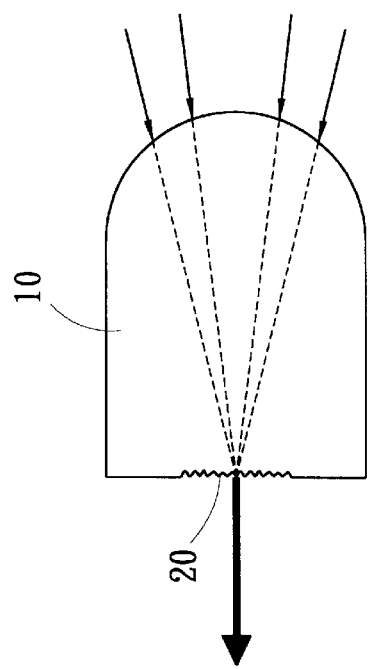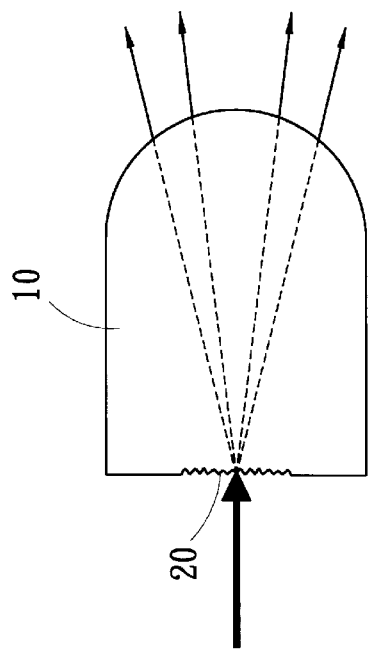

PLANAR WAVEGUIDE DIFFRACTIVE BEAM SPLITTER/COUPLER

BACKGROUND OF THE INVENTION

1. Field of the Invention

The invention generally relates to an optical beam splitter/coupler, and more particularly relates to a planar waveguide diffraction 1×N beam splitter/coupler fabricated by an integrated circuit manufacturing process.

2. Related Art

In recent years, the wavelength division multiplexing (WDM) method has been widely used in fiber optic communication systems. 30 or more channels carrying light beams of different wavelengths are used to transfer data so as to increase the information carrying capacity. To fulfill the demand of increasing transference capacity, a structure of dense wavelength division multiplexing (DWDM) is being developed to increase the density of the transmission channel and create a high capacity, wide band fiber optic communication system. In a DWDM system, a plurality of information carrying light beams of different wavelengths are combined (coupled or multiplexed) onto a single fiber to increase its information carrying capacity through the optical fiber. At the receiving end, the beams are spatially separated (split or demultiplexed) and each beam is received by a separate detector for recovery of the information that it carries. Current common techniques for beam splitting coupling are fused fiber and ribbed waveguide. The fused fiber is easy to fabricate but inadequate for beam splitting because it has fewer channels, bulky dimensions and unsatisfactory component integration. On the contrary, the waveguide coupler has better beam splitting, more channels, less dimensions and better component integration, but is relatively difficult to fabricate and is less flexible in assembly applications.

The previous beam splitters and couplers have the disadvantages of higher energy loss and higher fabrication cost. Especially when fabricating a 1×N/N×1 beam splitter/coupler, it requires a plurality of 1×2/2×1 beam splitters/beam couplers linking serially, which loses a great deal of transmission energy.

U.S. Pat. No. 4,953,935 by Suchoski, Jr., et al. entitled "Integrated Optic Star Coupler" and issued Sep. 4, 1990 discloses an optical coupler including a planar substrate for receiving a circuit array of one or more surfaces for splitters disposed thereon by a two step proton exchange (TSPE) process. Although the optical coupler is fabricated through a semiconductor process, it still has the disadvantages of higher waveguide loss and coupling loss.

U.S. Pat. No. 4,274,706 by Tangonan, et al. entitled "Wavelength Multiplexer/demultiplexer for Optical Circuits" and issued Jun. 23, 1981 discloses a wavelength selective coupler that comprises a planar optical waveguide formed within a glass substrate having an input/output surface at one end and a curved surface at the other end upon which is mounted a reflective diffraction grating. The periodic diffraction grating acts as a demultiplexer. The grating is a separate unit adhered to the curved surface that is formed on one end of the waveguide. The input/output surface formed at the other end of the waveguide is a polished flat surface. The fabrication processes for the curved surface and the flat surface and adhering of the grating are rather complicated and difficult.

SUMMARY OF THE INVENTION

The object of the invention is therefore to provide a beam splitter/coupler, which is easy to fabricate, small in size and more flexible for applications.

To achieve the aforesaid object, a beam splitter/coupler according to the invention utilizes a Fourier transform diffractive optical element (DOE). The surface of the diffractive optical element is designed to diffract an incident beam into several (N=number of) beams with the same intensity. The invention further applies fabrication techniques of the planar waveguide to form a Fourier transform diffractive optical element on one end of the planar waveguide. For example, a micro-etching process for the mask of the integrate circuit can be applied for fabricating a beam splitter/coupler with a Fourier transform diffractive optical element formed on a planar waveguide.

Further scope of applicability of the invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will become more fully understood from the detailed description given hereinbelow. However, this description is for purposes of illustration only, and thus is not limitative of the invention, wherein:

FIG. 6 is a planar view of beam paths in a first application of the invention, which is a 1×N beam splitter and form an optic star coupler;

FIG. 7 is a planar view of beam paths in a second application of the invention, which is a N×1 beam coupler;

FIG. 8 is a planar view of beam paths in a third application of the invention, which includes a 1×N beam splitter and a N×1 beam coupler;

FIGS. 9A to 10B are further planar views of beam paths in other embodiments of the invention in which the planar waveguides of beam splitters/couplers let the light beams pass through.

DETAILED DESCRIPTION OF THE INVENTION

Figure 1:
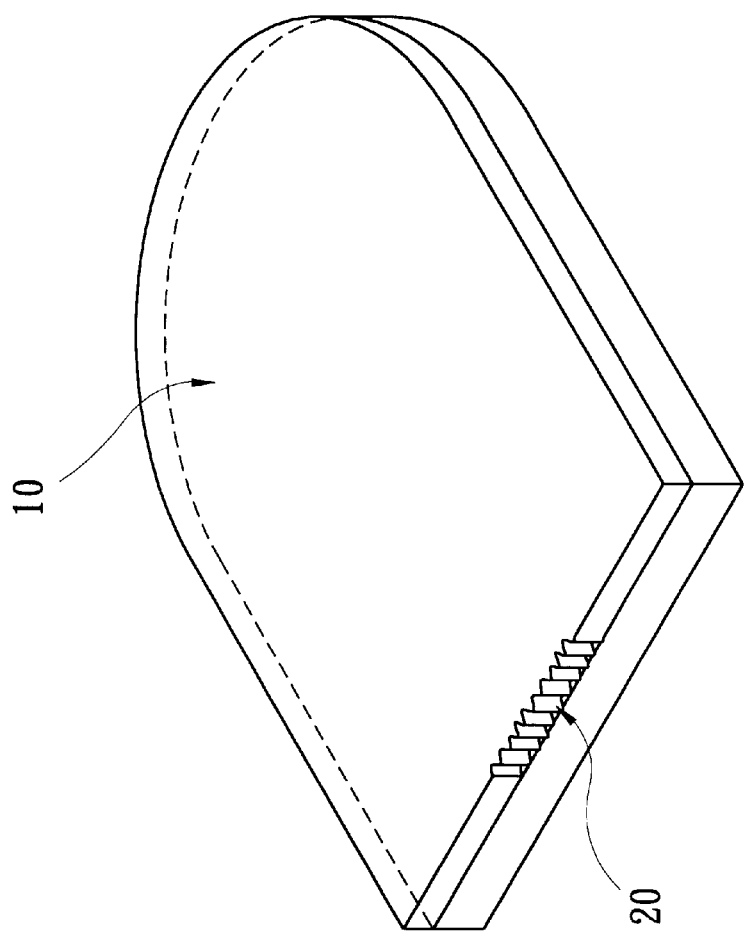
FIG. 1 is a perspective view of a beam splitter/coupler according to the invention.
Figure 2:
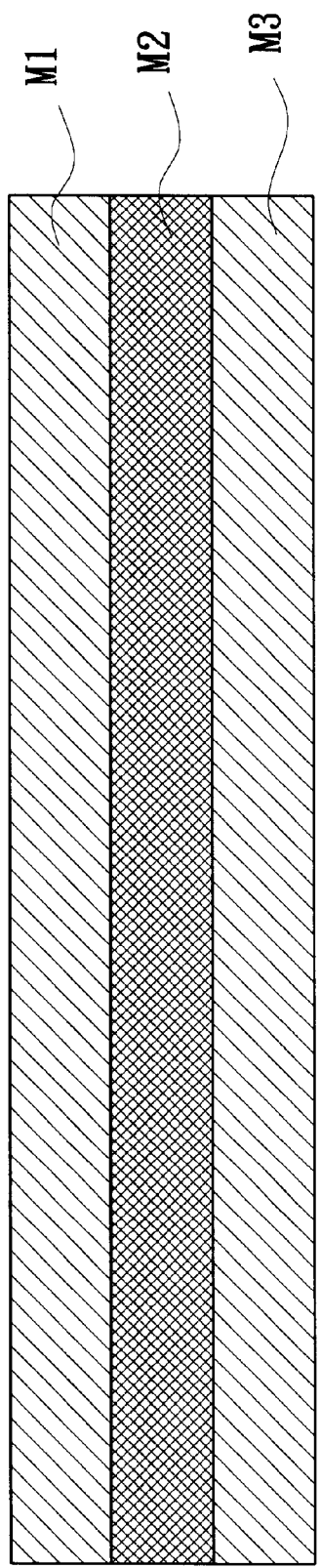
FIG. 2 is a sectional view of a planar waveguide in an embodiment of the invention.

As shown in FIG. 1, a beam splitter/coupler with a planar waveguide according to the invention includes a planar waveguide 10 composed of three optical material layers M1, M2 and M3, as shown in FIG. 2. The refractive indexes of the layers M1, M2 and M3 are n1, n2, and n3 respectively, in which n2>n1 and n2>n3 so as to make light beams coming into layer M2 totally refracted and transmitted therein. A Fourier transform diffraction element 20, fabricated by an integrated circuit process, is directly formed on one end of the planar waveguide 10. Therefore, an incident beam coming from one end of the planar waveguide 10 is diffracted into several (N) beams, as shown in FIG. 6. On the other hand, several (N) beams coming from one end of the planar waveguide 10 will be coupled into one beam, as shown in FIG. 7.

Figure 3A:
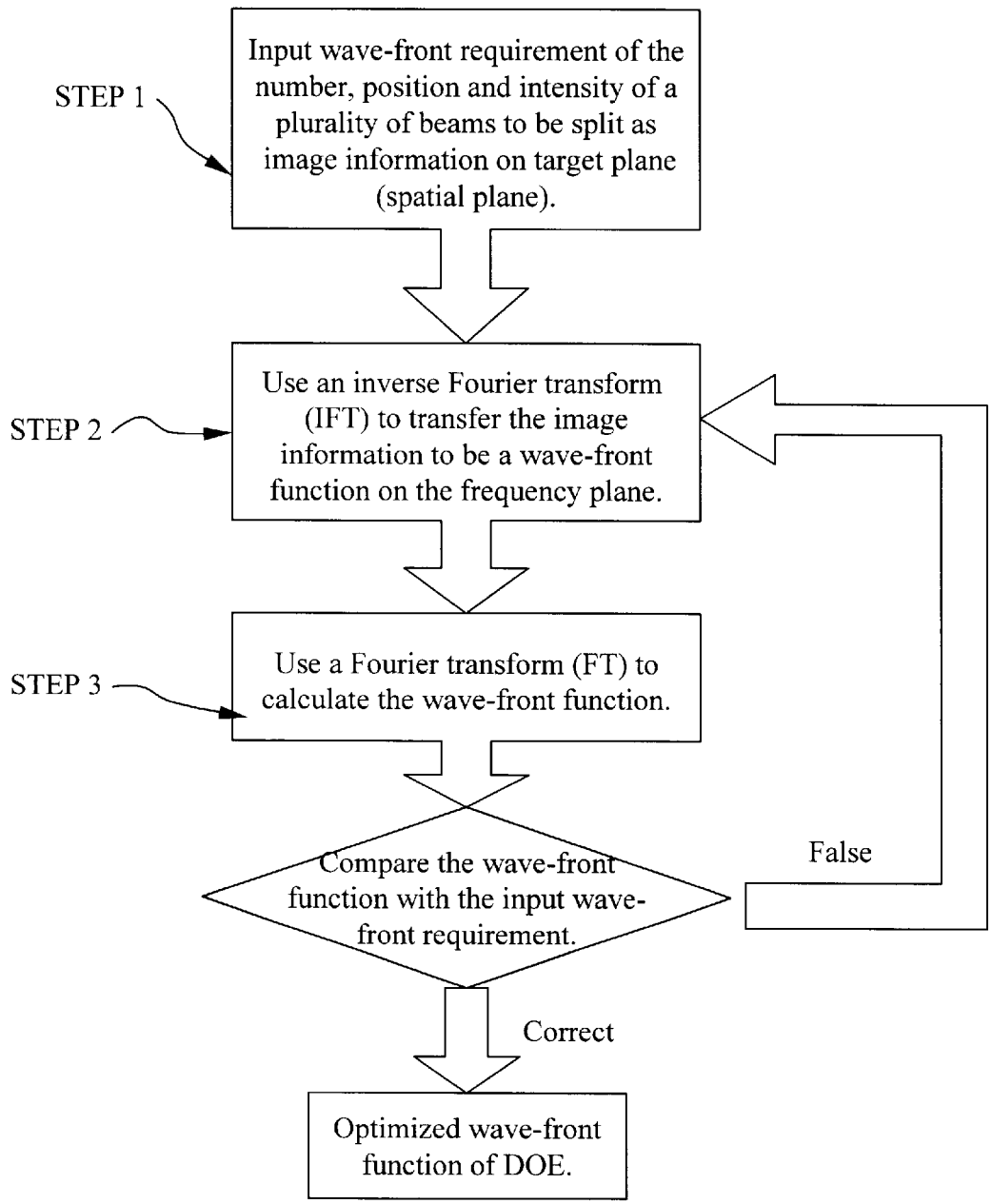
FIGS. 3A, 3B is a flowchart for designing the shape of a Fourier transform DOE in an embodiment of the invention through the operations of inverse Fourier transform and Fourier transform.
Figure 3B:
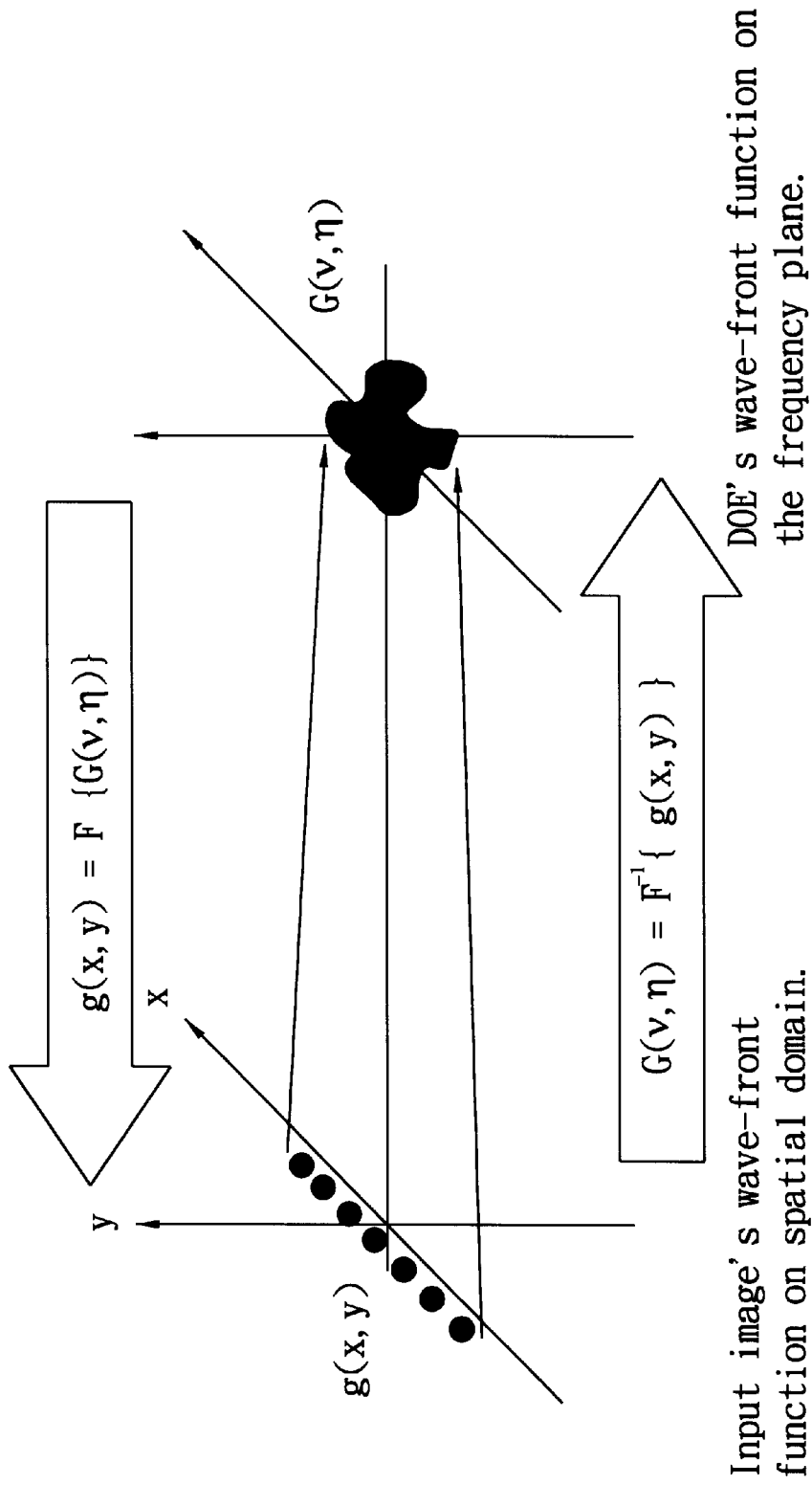

The shape of the Fourier transform diffraction element 20 is defined by a contour formed on one end of the planar waveguide 10. The design process is illustrated in FIGS. 3A and 3B. First, in step 1, determine the number, position and intensity of a plurality of beams to be split on a target image plane as a function of g(x,y). Then, use an inverse Fourier transform (IFT) to obtain a wave-front function, G(ν,η) at frequency plan and use a Fourier transform (FT) to calculate this wave-front function (steps 2, 3), and repeat step 2 and 3 to obtain a optimization wave-front function. Finally, use the final wave-front function to illustrate the shape of the Fourier transform diffraction element 20.

Figure 4:
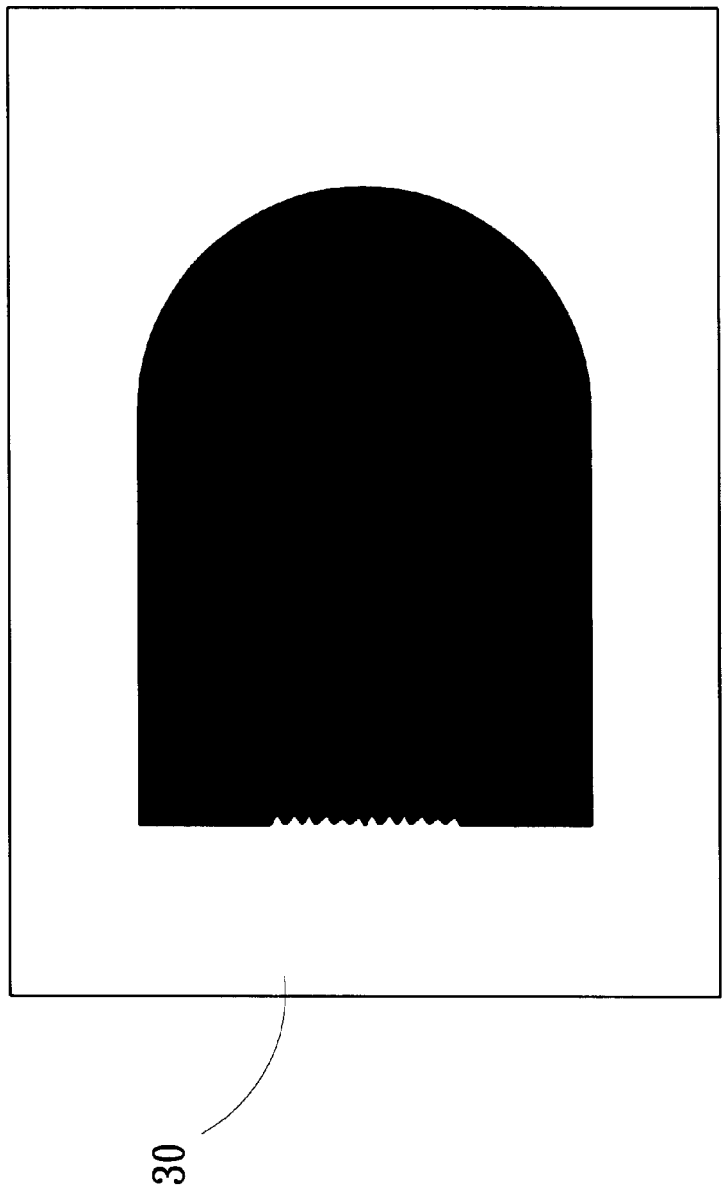
FIG. 4 is a planar view of a mask of the Fourier transform DOE fabricated by a micro-etching process for the mask of the integrated circuit.

After determining the shape of the Fourier transform diffraction element 20, a mask 30 with a contour as shown in FIG. 4 will be made. One end of the mask 30 has a contour corresponding to the shape of the Fourier transform diffraction element 20 to be fabricated. Then, use a micro-etching technique of the integrated circuit fabrication process to form the Fourier transform diffraction element 20 on one end of the planar waveguide 10.

Figures 5A, 5B:
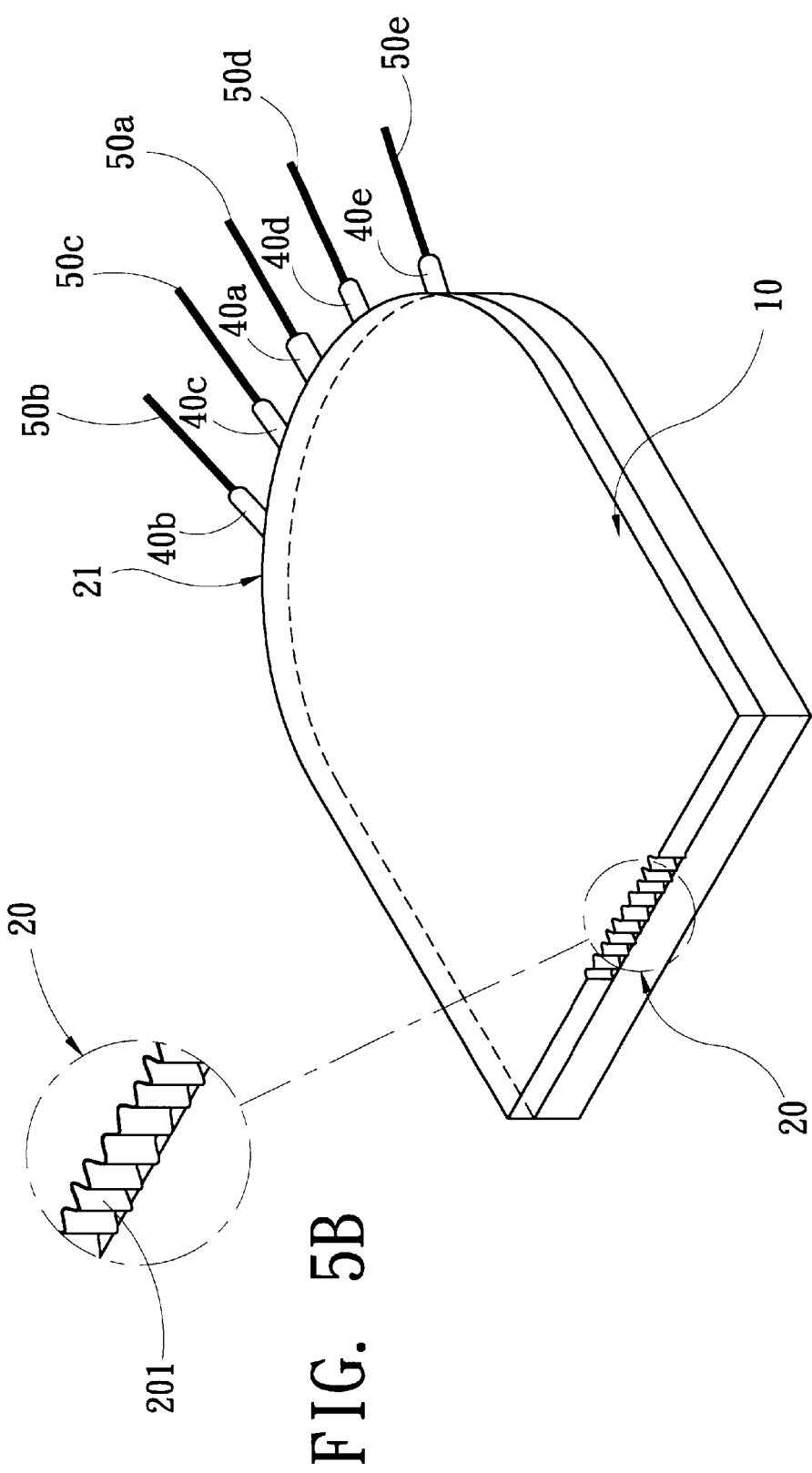
FIG. 5A is a perspective view of an embodiment of the invention in which a planar waveguide is designed to be a reflective beam splitter.
FIG. 5B is a partial enlarged view of FIG. 5A.

FIG. 5A is a perspective view of an embodiment of the invention in which a planar waveguide is designed to be a reflective beam splitter. The Fourier transform diffraction element 20 formed on one end of the planar waveguide 10 is furnished with a metallic layer 201 (as shown in FIG. 5B) to act as a reflector. The output ports, called optical fiber connecting ends 21, and the input end of the incident beam are all located on the opposite end of the Fourier transform diffraction element 20. On the optical fiber connecting ends 21 a plurality of GRIN lenses (having gradient refractive indexes) 40a~40e are used to couple the beam splitter/coupler to a plurality of optical fibers 50a~50e so that an incident beam coming from a fiber can be split into other fibers, or incident beams can be coupled into a single fiber. The number of fibers is determined by the original design of the number of beams to be split. That is, N+1 fibers are needed for N split beams.

The followings are application examples of 1×4 beam splitters/couplers with planar waveguides.

FIG. 6 is a planar view of the beam paths in a 1×4 beam splitter. A GRIN lens 40a is a collimator for collimating an incident beam coming from an optical fiber 50a into the planar waveguide 10. The incident beam is then guided in the planar waveguide 10 and diffracted by the Fourier transform diffraction element 20 into four output beams. The output beams pass through the planar waveguide 10, enter the other GRIN lenses 40b~40e and are collimated into the other fibers 50b~50e.

FIG. 7 is a planar view of beam paths in a 4×1 beam coupler. The input and output beam paths are the reverse of those in the beam splitter of FIG. 6. The GRIN lenses 40b~40e are collimators for collimating incident beams coming from the optical fibers 50b~50e into the planar waveguide 10. The incident beams are then guided in the planar waveguide 10 and diffracted and coupled by the Fourier transform diffraction element 20 into a single output beam. The output beam passes through the planar waveguide 10, enters the GRIN lens 40a and is collimated into the fiber 50a.

FIG. 8 is a planar view of the beam paths in an application of the invention that links a 1×4 beam splitter and a 4×1 beam coupler together and forms an optic star coupler.

FIGS. 9A to 10B are further planar views of the beam paths in other embodiments of the invention in which the planar waveguides of beam splitters/couplers allow light beams to pass through. The only difference between these beam splitters/couplers and those of the aforesaid embodiment of FIGS. 5A and 5B is that no metallic layers 201 are furnished on the Fourier transform diffraction elements 20. Therefore, the incident beam or beams coming from one end of the planar waveguide 10 can pass through the planar waveguide 10, be diffracted by the Fourier transform diffraction element 20 and enter the output fiber(s) located at the other end of the planar waveguide 10. By suitably designing the locations of the input and output GRIN lenses and fibers, the beam splitters/couplers will function effectively.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A beam splitter/beam coupler with a planar waveguide, comprising:

a planar waveguide having a substantially flat first end and a contoured second end and having three optical material layers M1, M2, and M3 having refractive indices n1, n2, and n3, respectively, in which n2>n1 and n2>n3 so that light beams entering layer M2 are totally refracted and transmitted therein; and a Fourier transform diffraction element formed on the first end of said planar waveguide for diffracting an incident beam entering one of the first or the second end of the planar waveguide into a plurality of output beams, and coupling a plurality of incident beams entering one of the first or the second end of the planar waveguide into one output beam.

2. The beam splitter/beam coupler with a planar waveguide according to claim 1, wherein the shape of said Fourier transform diffraction element is determined by the contour of the second end of said planar waveguide.

3. The beam splitter/beam coupler according to claim 1, wherein the shape of said Fourier transform diffraction element is determined by a shape of a wave-front function calculated through processes of an inverse Fourier transform and a Fourier transform.

4. The beam splitter/beam coupler according to claim 1, wherein said Fourier transform diffraction element is a reflector, and said incident and output beams are all located on the second end of said planar waveguide.

5. The beam splitter/beam coupler with a planar waveguide according to claim 4, wherein said Fourier transform diffraction element is furnished with a metallic layer on a surface thereof for reflecting diffracted beams.

6. The beam splitter/beam coupler with a planar waveguide according to claim 1, wherein said Fourier transform diffraction element lets the incident beam(s) pass through so that said incident beam(s) enter one of the first and the second ends of said planar waveguide, and said output beams emanate from another of the first and the second ends of said planar waveguide.

7. The beam splitter/beam coupler with a planar waveguide according to claim 1, further comprising a plurality of GRIN lenses having gradient refractive indices and a plurality of fibers coupled to said plurality of GRIN lenses so as to collimate said incident and output beams.

* * * * *